United States Patent [19]

Falamak

[11] Patent Number: 4,733,737

[45] Date of Patent: Mar. 29, 1988

[54] DRIVABLE STEERABLE PLATFORM FOR INDUSTRIAL, DOMESTIC, ENTERTAINMENT AND LIKE USES

[76] Inventor: Reza Falamak, P.O. Box 770188, Houston, Tex. 77215

[21] Appl. No.: 770,729

[22] Filed: Aug. 29, 1985

[51] Int. Cl.$^4$ ............................................. B62D 57/00
[52] U.S. Cl. ................................... 180/7.1; 74/665 C; 74/665 N; 180/252; 180/255
[58] Field of Search ................. 180/20, 155, 255, 252, 180/7.1, 168; 74/665 L, 665 M, 665 N, 665 C, 665 A; 901/25, 26, 29

[56] References Cited

U.S. PATENT DOCUMENTS

| | | | |
|---|---|---|---|
| 1,026,122 | 5/1912 | Prather | 180/255 |
| 1,266,904 | 5/1918 | Baker | 180/255 |
| 3,232,005 | 2/1966 | Lahr | 180/255 |
| 4,463,821 | 8/1984 | Falamak | 180/251 |
| 4,519,466 | 5/1985 | Shiraishi | 180/7.1 |
| 4,533,998 | 8/1985 | Falamak | 180/168 |

FOREIGN PATENT DOCUMENTS 512471  2/1954  Belgium ............................... 180/7.1

Primary Examiner—John J. Love
Assistant Examiner—Everett G. Diederiks, Jr.
Attorney, Agent, or Firm—Arnold, White & Durkee

[57] ABSTRACT

This invention comprises a driveable, steerable platform for industrial, domestic, entertainment and related uses. A frame member travels on a plurality of wheels which can be turned 360° to steer the platform in a desired direction. Separate endless drive means in the form of gear-driven concentric shafts drive and steer the wheels. The platform travels substantially parallel to the terrain traversed. The entire platform may be housed in a hollow sphere to cause the sphere to selectively roll, providing the platform the ability to move about on radically uneven terrain including the ability to climb steps of height equal to approximately one-half the sphere's diameter. The wheels engage the inner surface of the rolling sphere to drive and steer the rolling sphere.

10 Claims, 7 Drawing Figures

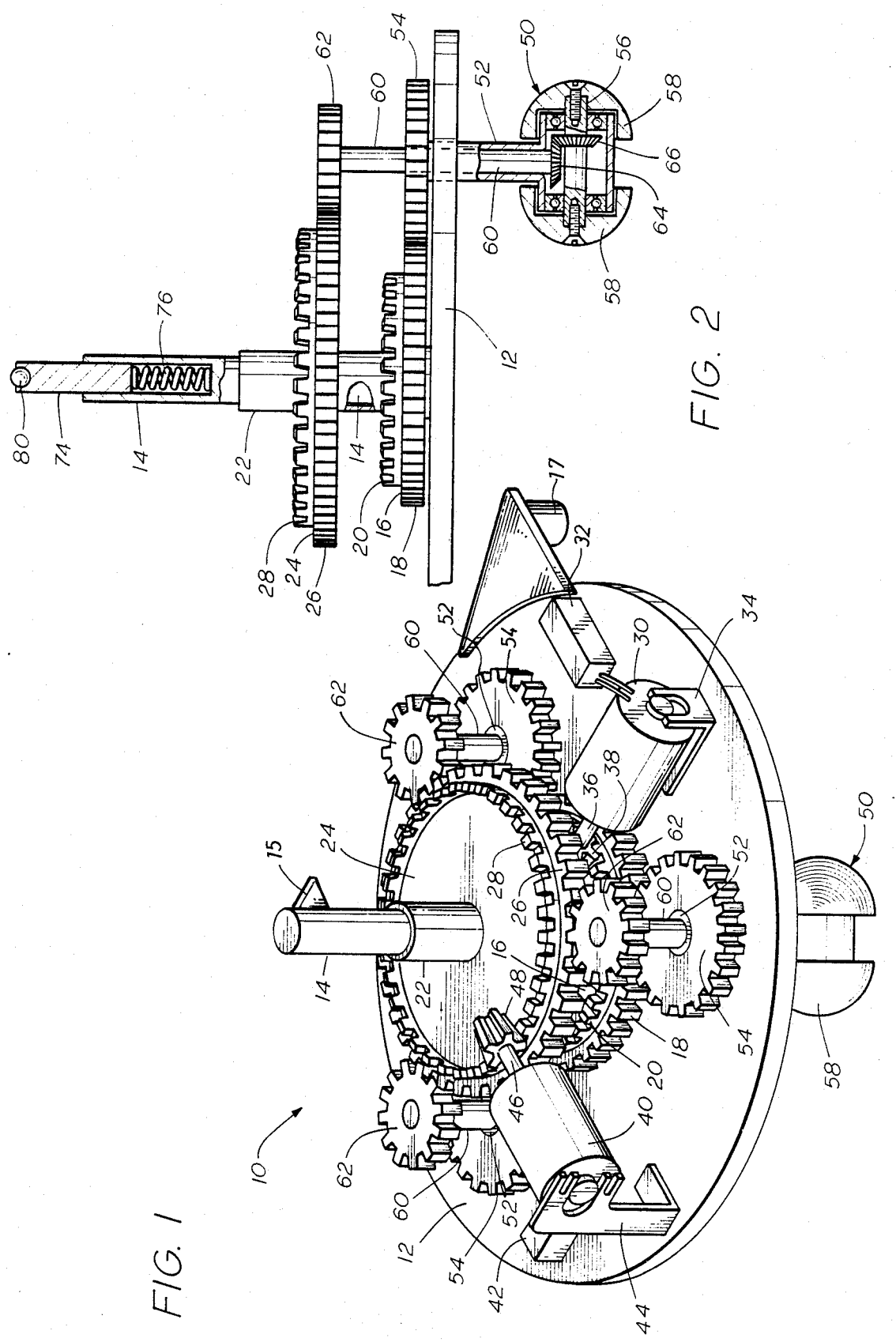

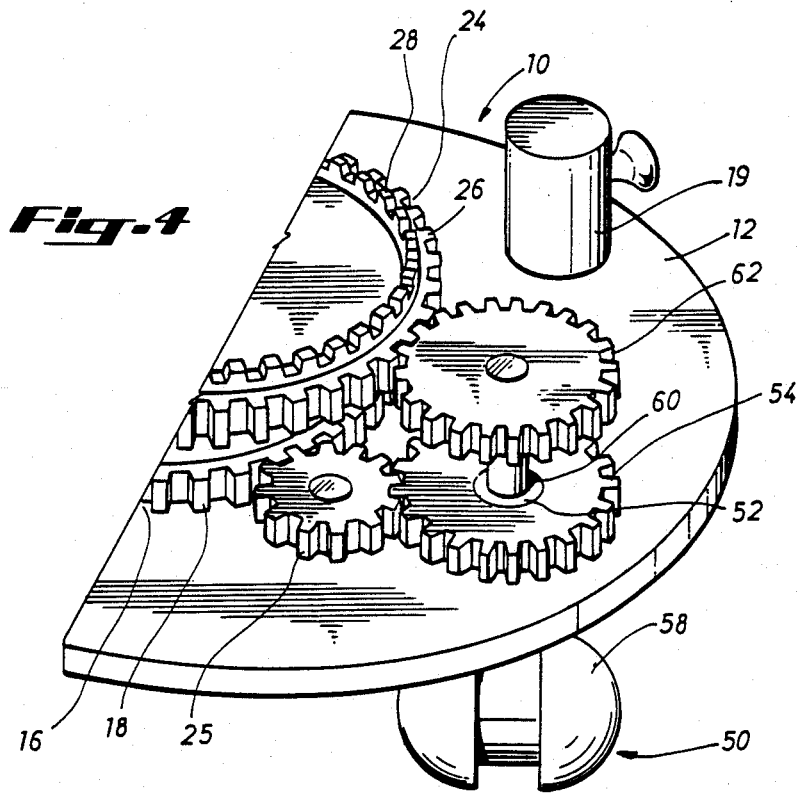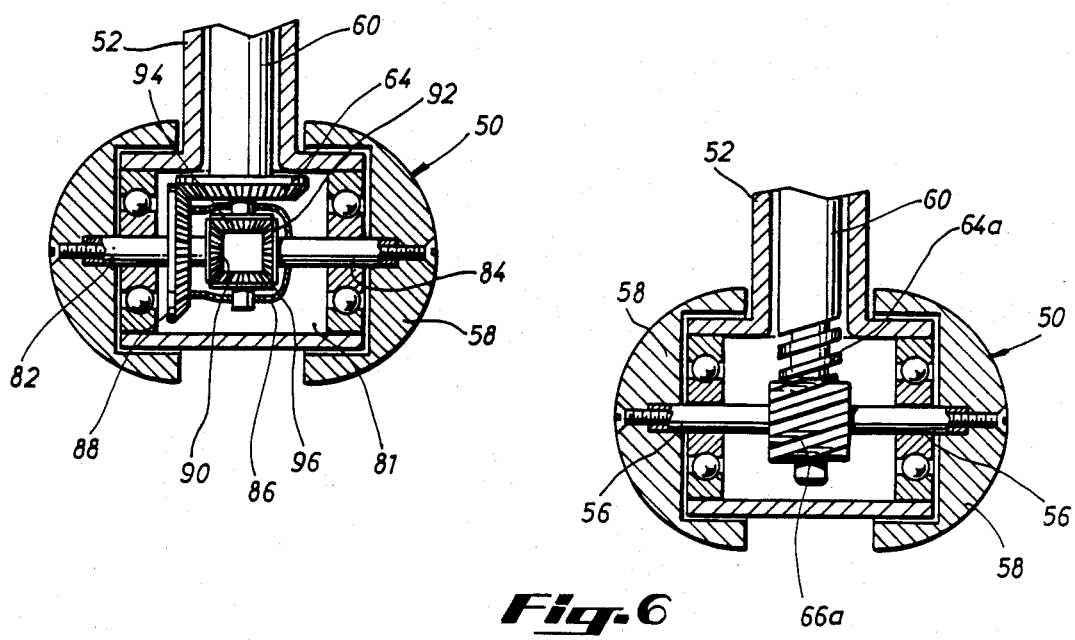

DRIVABLE STEERABLE PLATFORM FOR INDUSTRIAL, DOMESTIC, ENTERTAINMENT AND LIKE USES

This application is related to my earlier application, Ser. No. 628,337, filed July 6, 1984, now U.S. Pat. No. 4,533,998, which is a continuation of my earlier application, Ser. No. 353,250, filed Mar. 1, 1982, now U.S. Pat. No. 4,463,821.

BACKGROUND OF THE INVENTION

This invention relates generally to steerable vehicles, and more particularly to drivable platforms capable of being steered at any angle through 360°.

Drivable, steerable platforms have been used in industrial and agricultural equipment. Known prior art devices utilize complex mechanical linkages to effectuate steering. The mechanical steering linkages are actuated by hydraulic cylinders driven by a selectively actuated hydraulic pump. The wheels can typically be steered through angles greater than 180°. However, due to the mechanical limitations of the linkage system the wheels cannot be steered through any angle between 0° and 360° degrees.

Typically, such platforms receive their driving power from an internal combustion engine or an electric motor driven by a battery. The engine or motor drive a hydraulic pump which delivers fluid under pressure to hydraulic motors attached to each wheel of the platform. The hydraulic motors that drive the wheels must be carefully regulated for the wheels to all turn at the same speed.

Other known prior art devices include cable steering systems. These devices include a plurality of spools on which cable is wound and unwound to effectuate steering. In such systems, the wheels of the vehicle cannot be steered through any angle in the continuous range 0° to 360°.

The control apparatus of known prior art devices permit only limited control of a vehicle's steering and driving. One such remotely controlled device can be steered only through relatively large angular turns. Another such device operates only on the principle of random motion within a boundary.

The known prior art devices are generally characterized by complex mechanical and/or hydraulic construction and relatively poor control over steering and driving.

SUMMARY OF THE INVENTION

According to the present invention, a drivable, steerable platform is provided which can be accurately controlled. The platform may be guided in any lateral direction from 0° to 360° by manual control, remote control, cassette and computer program control without a steering wheel. The control structure can be capable of controlling angular movements to as fine as a fraction of a degree, and straight line movements as fine as a fraction of an inch. The platform has a minimum turning radius of zero. In one embodiment, a drivable, steerable platform includes a frame member, a drive gear arrangement, a steering gear arrangement, and at least 3 wheel assemblies.

The steering gear arrangement includes a steering shaft rotatably attached to the platform member. It also includes an endless drive system, preferably including a steering gear rigidly attached to the steering shaft and a steering drive device. The steering drive device transmits motion to the steering gear.

The drive gear arrangement includes a rotatable drive shaft mounted concentrically with the steering shaft, a drive gear rigidly attached to the drive shaft, and a driving device. The driving device transmits motion to the drive gear.

Each wheel assembly includes a hollow, pipe-like steering control shaft which is rotatably attached to and extends normally downward from the platform. Attached to each steering control pipe shaft is a separate steering control gear which meshes with the main steering gear.

A separate wheel and axle assembly is mounted to each steering control pipe shaft at the end opposite the steering control gear. The wheel is capable of rotating in a wheel rotation plane about an axis substantially parallel to the frame member plane and essentially perpendicular to the steering control shaft plane. The wheel axles all lie in substantially the same plane.

Each wheel assembly includes at least one wheel per axle. Each wheel is rigidly mounted on its axle and rotates in a plane essentially parallel to the steering control shaft.

Each wheel assembly also has a drive control shaft rotatably and concentrically or coaxially mounted within the steering control pipe shaft. Rigidly attached to the drive control shaft is a drive control gear which meshes with the main drive gear. The drive control shaft extends normally downward in order to couple with the wheel axle and transmits rotary motion to that axle about its axis.

According to another aspect of this invention, means are included for activating the drive and steering structures. The actuating means include but are not limited to manual, remote, cassette or computer controls.

In a variation of the invention, a receiver may be included which can receive broadcast signals from a remote control point. The received signals are processed to provide control signals for the control circuit. a transmitter may be included forwarding the broadcasting signals back to the remote control point.

In another variation of the invention the platform is encapsulated in a gimbal-like manner within a spherical member. This arrangement provides the platform the ability to move about on radically uneven terrain. So encapsulated, the platform can climb steps of height equal to approximately one-half the diameter of the spherical member.

In a modification of the invention, a tray, carriage member or other implement may be rigidly mounted to the platform or may be mounted so that it rotates in synchronism with the steering shaft. A direction finder or other direction sensitive or indicating implement may also be attached to the main steering shaft or otherwise mounted so that it rotates in synchronism with the main steering shaft.

The present invention may be advantageously used for industrial, domestic, entertainment and like uses, including industrial and domestic robots and toys.

BRIEF DESCRIPTION OF THE DRAWINGS

The invention will further be described by reference to the accompanying drawings, where like members have like reference numerals.

FIG. 1 is a perspective view of one embodiment of a drivable, steerable platform according to the present invention;

FIG. 2 is a perspective view of a wheel assembly employed in the platform depicted in FIGS. 1 and 3, and of a top shaft assembly employed in the embodiment depicted in FIG. 3;

FIG. 4 is a fragmentary perspective view of a platform including an intermediate steering gear;

FIG. 5 is a cross-sectional view of a wheel assembly including a differential gear arrangement;

FIG. 6 is a cross-sectional view of a wheel assembly including a worm gear arrangement.

DESCRIPTION OF THE PREFERRED EMBODIMENT

Figure 3:
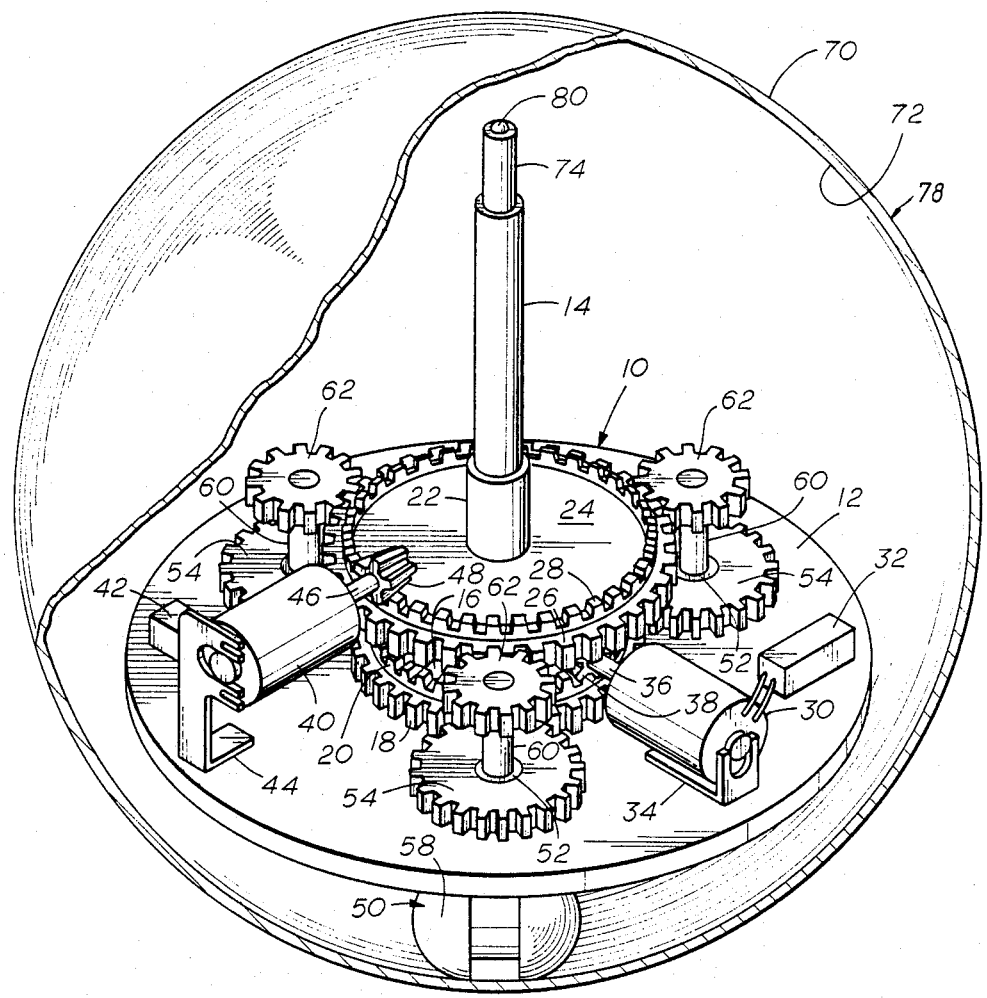
FIG. 3 is a fragmentary perspective view of a drivable, steerable platform encapsulated within a spherical member.

Referring to the drawings and in particular to FIG. 1, there is shown a drivable, steerable platform 10 having a frame member 12 generally disposed in a lateral plane.

The platform 10 includes a steering shaft 14. One end of steering shaft 14 is rotatably attached to and extends normally from the frame member 12. The steering shaft is free to rotate endlessly relative to the frame member 12. A steering gear 16 is rigidly attached to the steering shaft 14.

The steering gear 16 has control teeth 18 and drive teeth 20. The control teeth 18 are circumferentially disposed, rigidly attached to and extend radially outwardly from the steering gear 16. The control teeth 18 lie generally in the same plane as the steering gear 16. The drive teeth 20 are circumferentially disposed, rigidly attached to and extend normally from the side of steering gear 16.

A drive pipe shaft 22 is concentrically and rotatably mounted around the steering shaft 14. The drive pipe shaft 22 is free to rotate endlessly relative to the steering shaft 14. A drive gear 24 is rigidly attached to the drive pipe shaft 22. The drive gear 24 has control teeth 26 and drive teeth 28. The control teeth 26 are circumferentially disposed, rigidly attached to and extend radially outwardly from the drive gear 24. The control teeth 26 lie generally in the same plane as the drive gear 24. The drive teeth 28 are circumferentially disposed, rigidly attached to, and extend normally from the drive gear 24—i.e., perpendicular to the side of drive gear 24.

A steering motor 30 with a power source 32 is provided to drive the steering gear 16. The steering motor 30 is rigidly attached to the frame member 12 by a motor support member 34. The steering motor 30 includes a shaft 36 and a drive gear 38. The steering motor drive gear 38 is rigidly attached to the steering motor shaft 36. The steering motor drive gear 38 meshes with the steering gear drive teeth 20. The steering motor 30 is actuated by a platform steering control means not shown.

A drive motor 40 is provided with a power source 42 to drive the drive gear 24. The drive motor is rigidly attached to the platform frame member 12 by a motor support member 44. The drive motor 40 includes a shaft 46 and a drive gear 48. The drive motor drive gear 48 is fixedly attached to the drive motor shaft 46. The drive motor drive gear 48 meshes with the drive gear drive teeth 28. The drive motor 40 is actuated by a platform driving control means not shown.

Figure 7:
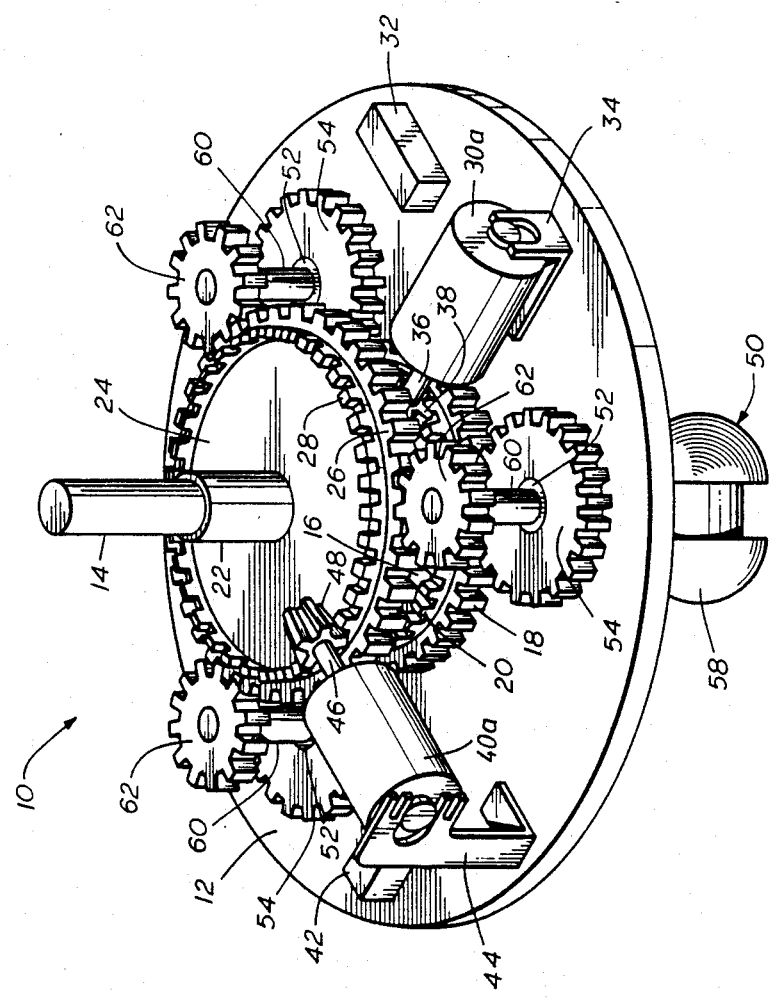
FIG. 7 is an alternate embodiment of the platform illustrated in FIG. 1 but having an internal combustion engine instead of electric motors powered by electric batteries.

It is also possible to eliminate either power source 32 or 42 where the other is sufficient to power both the drive motor 40 and steering motor 30. Yet further, as illustrated in FIG. 7, the motors 30, 40 and the power sources 32, 42 can be replaced by internal combustion engines 30a, 40a as will be apparent to those skilled in the art.

As shown in FIGS. 1 and 2, the platform 10 further includes three identical wheel assemblies 50. Each wheel assembly 50 includes a hollow, pipe-like, steering control shaft 52 which is rotatably attached to and extends normally downward from the platform member 12. The steering control shaft 52 is free to rotate endlessly relative to the platform member 12.

A steering control gear 54 is rigidly attached to the steering control shaft 52. The steering control gear 54 meshes with the steering gear control teeth 18 and is directly driven by the steering gear 16.

A wheel axle 56 is rotatably attached to the lower end of steering control shaft 52—i.e., at the end opposite the steering control gear 54. The axis of the wheel axle 56 lies in a plane generally perpendicular to the steering control shaft 52 and generally parallel to the frame member 12.

As shown in FIG. 2, the wheel axle 56 includes a wheel axle gear 66 which is conveniently a bevel gear. Rigidly attached to each end of each wheel axle 56 are wheels 58.

The wheel assembly 50 further includes a drive control shaft 60. The drive control shaft 60 is concentrically and rotatably mounted within the steering control shaft 52. The drive control shaft 60 is free to rotate endlessly within the steering control shaft 52.

A drive control gear 62 is fixedly attached to the upper end of drive control shaft 60. The drive control gear 62 meshes with the drive gear control teeth 26 and is directly driven by the drive gear 24.

As depicted in FIG. 2, the drive control shaft 60 extends normally downward inside the steering control sahft 52 in order to couple with the wheel axle gear 66. The coupling end of the drive control shaft 60 includes a drive control shaft drive gear 64. The drive gear 64 meshes with the wheel axle gear 66 to directly drive the wheel axle 56.

Illustrated in FIG. 5 is a platform wheel assembly 50 comprising a differential gear arrangement 81. It will be apparent to one skilled in the art that the differential gear arrangement 81 will minimize friction on the wheels 58, and reduce the angular slip of the platform 10.

The differential gear arrangement 81 comprises a drive control shaft drive gear 64, a wheel axle having two half shafts 82 and 84, a differential housing 86, a ring gear 88, two half shaft pinion gears 90 and 92 and two differential gears 94 and 96.

In this embodiment the wheel axle comprises the two half shafts 82 and 84. Rigidly attached to the free end of both half shafts 82 and 84 are the half shaft pinion gears 90 and 92. The half shaft pinion gears 90 and 92 are enclosed within the differential housing 86. The differential housing 86 is rotatably attached to the half shafts 80 and 84. The gears 94 and 96 are of course free-running, as will be apparent to those skilled in the art.

It will be apparent to one skilled in the art from the present disclosure as a whole that various other differential gear arrangements can be used. Moreover, arrangements other than differential gear arrangements can be used without departing from the spirit of the present invention. Two such alternate arrangements include the use of worm gears 66a, 64a (FIG. 6) and of bevel gears 66, 64 (FIG. 2). The use of a differential is preferred for the resulting higher accuracy, lower friction and greater traction. The alternate embodiment in which worm gears are used with each wheel assembly permits reduced speed and increased torque.

In operation, the platform speed and direction may be determined by a platform control means not shown. Control means available include but are not limited to manual, remote, cassette or computer program controls. Such control means are claimed and more specifically described in the original application Ser. No. 353,250, filed Mar. 1, 1982 and now U.S. Pat. No. 4,463,821, and in continuation application Ser. No. 628,337, filed July 6, 1984 and now U.S. Pat. No. 4,533,998, both of which are hereby incorporated by reference. The control means of the preferred embodiment actuates the steering motor 30 and the drive motor 40 independently from each other.

The steering motor 30, when actuated by the control means not shown, directly drives the steering gear 16. The steering gear 16 simultaneously and uniformly turns each of the steering control gears 54. The angular rotation of each steering control gear 54 is directly imparted to steer the wheel axle 56 through the steering control shaft 52.

It will be apparent to one skilled in the art that the platform 10 never turns. The direction of the platform's travel is determined by the movement of the steering control shaft 52. The platform travels in straight line segments, with movement of the steering control shaft 52 marking the beginning and the end of a particular straight line segment. Thus travel along a curved path is approximated by travel along straight line segments that are essentially chords to the curve, the smaller the length of the chords the better the approximation to the curve.

Consequently, actuation of the steering motor by the control means provides a means of determining and controlling the direction of the platform.

When actuated by the control means the drive motor 40 directly drives the drive gear 24. The drive gear 24 simultaneously and uniformly turns each of the drive control gears 62. The angular rotation of the drive control gear 62 is directly imparted on to the drive control shaft 60. The drive control shaft drive gear 64 then couples with the wheel axle gear 66 and radially rotates the wheel axle 56.

Consequently, actuation of the drive motor by the control means provides a means of determining and controlling the platform's speed of travel.

Since the platform 10 remains substantially parallel to the plane of the terrain over which it moves, it will be apparent to those skilled in the art that the platform can be readily adapted to transport items or materials from one point to another. A tray, robot arm, end effector, suction device, shelf, carriage member and so forth may be attached, for example, to the frame member 12 or to rotate in synchronism with the main steering shaft—i.e., shaft 14 in FIG. 1.

A direction finder or indicator 15 (e.g., flag, light, camera, sonar, range finder, infrared detector, or the like) may be added to the platform to indicate, or to acquire and generate information needed to control, the direction in which the platform will travel. Such an indicator may be mounted or suitably coupled to the steering shaft 14, steering gear 16, steering control shaft 52 or the steering control gear 54 so that it rotates in synchronism with the steering shaft 14. In any such embodiment, it will be apparent to one skilled in the art that the steering gear 16 and steering control gear 54 must be appropriately dimensioned so that each of the gears 16 and 54 simultaneously undergo the same angular translation.

It will be further apparent to one skilled in the art that when a direction indicator is attached, for example, to the steering shaft 14 an intermediate gear 25 is required. FIG. 4 shows the intermediate steering gear 25. The gear 25 is rotatably attached to the frame member 12 by an intermediate gear shaft (not shown). The intermediate gear 25 meshed with and is driven by the steering gear 16 and simultaneously meshes with a steering control gear 54. It will be apparent to one skilled in the art that this arrangement allows the steering shaft 14 and the steering control gear 54 to turn in the same direction.

In operation, the platform 10 may be used in conjunction with a variety of implements attached to the platform. Implements available include but are not limited to omnidirectional vacuum cleaners, suction devices for omnidirectional vacuum cleaning, end effectors, metal detectors, script writers, spray painters, and torches, as well as trays, carriages, robotic arms, direction finders or indicators and so forth.

For example, a metal detecting implement 17 may be attached to the platform 10. (FIG. 1) This arrangement provides a means of finding metal coins, artifacts, pipelines, power lines or other metallic objects.

Another example includes having a paint sprayer 19 attached to the platform 10. (FIG. 4.) In operation this platform/paint sprayer may be used to paint walls, floors and ceilings of structures, parts used in assembly lines, lines on roadway, or any other painting function.

In yet another example, a script writer may be attached to the platform. The platform/script writer arrangement may be used to: draw graphics; make signs; design drawing and perform other like scriptive functions.

Consequently, there exists a multitude of applications for which the high accuracy and maneuverability of the present invention can be advantageously employed with various implements to fulfull many existing needs.

Furthermore, because the platform 10 itself never turns, the implement may be attached anywhere on the platform and have the same relative direction and speed of travel as the center of the platform 10, or as previously indicated, can be advantageously mounted to rotate in synchronism with the steering shaft 14.

Another aspect of the present invention is illustrated in FIG. 3. FIG. 3 depicts a platform 10 encapsulated in a spherical member 70. Each of the platform wheels 58 is in contact with the inner surface 72 of the spherical member 70.

The platform 10 of this embodiment further includes a spring-drive piston 74 mounted within the steering shaft 14, as best illustrated in FIG. 2. The steering shaft is concentrically bored out to provide a means to mount the piston 74. A spring 76 is attached to the bottom of the bored-out section of the steering shaft 14. The top end of the spring 76 is attached to the piston 74 which seats in the bored-out section of the steering shaft 14. A ball 80 is rotatably attached to the top end of the piston 74. In FIG. 3, the ball 80 contacts the top of the inner surface 72 of the spherical member 70. It will be apparent to those skilled in the art that the piston 74 could alternatively be mounted anywhere on the platform 10.

The ball 80 at end of the piston 74 and the platform wheels 58 are the platform's only contact points to the inner surface 72 of the spherical member 70. This gimbal-type arrangement serves several functions. One function of the arrangement is to stabilize the platform 10 within the spherical member 70. An additional and equally important function is to provide contact pressure between the wheels 58 and the spherical member's inner surface 72. The contact pressure allows the wheels 58 to translate their motion to the spherical member 70. The motion translated from the platform's wheels 58 causes the spherical member 70 to roll and provides the means for controlling the direction and speed of the rolling spherical member 70.

To aid in stabilizing the platform within the spherical member 70, it is preferred to have the center of gravity of the platform 10 located beneath the center of gravity of the spherical member 70.

A plurality of protrusions or depressions (not shown) may be included on the outer surface 78 of the spherical member 70 to improve traction of the rolling spherical member 70 over solid and semi-solid surfaces. Such protrusions, depressions or other traction improving structure is generally needed for the rolling sphere to climb stairs. Furthermore, a plurality of fins (not shown) may be included on the outer surface 78 to aid in directing and driving the rolling spherical member 70 through water.

The principles, preferred embodiments, and method of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of this invention.

What is claimed is:

1. A drivable, steerable platform comprising:
   a frame member disposed essentially in a frame member plane;
   a first shaft rotatably mounted on said frame member and essentially normal to said frame member plane;
   a first drive gear attached to said first shaft and disposed essentially parallel to said frame member plane;
   a second shaft rotatably and concentrically mounted relative to said first shaft;
   a second drive gear attached to said second shaft and disposed essentially parallel to said frame member plane;
   each of said first and second drive gears comprising fixedly attached drive teeth that lie generally normal to the frame member plane and fixedly attached control teeth that extend outward in generally the same plane as each of said first and second drive gears;
   a first driving mechanism in meshed relation with the drive teeth of said first drive gear and operable to drive said first drive gear;
   a second driving mechanism in meshed relation with the drive teeth of said second drive gear and operable to drive said second drive gear; and
   at least three wheel assemblies which each include a wheel steering control shaft in rotatable relation to and extending normally downward from said frame member, a wheel drive control shaft rotatably and concentrically mounted relative to said wheel steering control shaft, a steering control gear co-rotatably attached to said wheel steering control shaft and in meshed relation with the control teeth of one of said drive gears, a drive control gear attached in co-rotatable relation to the wheel drive control shaft and in meshed relation with the control teeth of the other said drive gear, a wheel axle, means for coupling said wheel steering control shaft to said wheel axle, means for coupling said wheel drive control shaft to said wheel axle, and at least one wheel mounted on said wheel axle.

2. The platform according to claim 1 wherein at least one of said first and second driving mechanisms comprises an internal combustion type engine.

3. The platform according to claim 1 further comprising an implement and means for supporting and rotating said implement in synchronism with said wheel steering control shaft.

4. The platform according to claim 1 further comprising an implement fixedly attached to said frame member.

5. A drivable, steerable platform comprising:
   a frame member disposed essentially in a frame member plane;
   a first shaft rotatably mounted on said frame member and essentially normal to said frame member plane;
   a first drive gear attached to said first shaft and disposed essentially parallel to said first member plane;
   a second shaft rotatably and concentrically mounted relative to said first shaft;
   a second drive gear attached to said second shaft and disposed essentially parallel to said frame member plane;
   each of said first and second drive gears comprising fixedly attached drive teeth and fixedly attached control teeth;
   a first driving mechanism in meshed relation with the drive teeth of said first drive gear and operable to drive said first drive gear;
   a second driving mechanism in meshed relation with the drive teeth of said second drive gear and operable to drive said second drive gear; and
   at least three wheel assemblies which each include a wheel steering control shaft in rotatably relation to and extending normally downward from said frame member, a wheel drive control shaft rotatably and concentrically mounted relative to said wheel steering control shaft, a steering control gear co-rotatably attached to said wheel steering control shaft and in meshed relation with the control teeth of one of said drive gears, a drive control gear attached in co-rotatable relation to the wheel drive control shaft and in meshed relation with the control teeth of the other said drive gear, a wheel axle, means for coupling said wheel steering control shaft to said wheel axle, means for coupling said wheel drive control shaft to said wheel axle, and at least one wheel mounted on said wheel axle.

6. The platform according to claim 1 or claim 5 wherein at least one of said first and second driving mechanism comprises a battery powered electric motor.

7. The platform according to claim 1 or claim 5 wherein the means for coupling the wheel drive control shaft to the wheel axle comprises a pinion gear arrangement which has a wheel drive shaft pinion gear fixedly attached to the coupling end of the wheel drive control shaft, and a wheel axle pinion gear fixedly attached to the wheel axle that couples with the wheel drive shaft pinion gear.

8. The platform according to claim 7 wherein at least one of said pinion gears comprises a bevel gear.

9. The platform according to claim 1 or claim 5 wherein the means for coupling the wheel drive control shaft to the wheel axle comprises a worm gear arrangement which has a wheel drive shaft worm gear fixedly attached to the coupling end of the wheel drive control shaft, and a wheel axle worm gear fixedly attached to the wheel axle that couples with the wheel drive shaft worm gear.

10. The platform according to claim 1 or claim 5 wherein the means for coupling the wheel drive control shaft to the wheel axle comprises a differential gear arrangement.

* * * * *